US012619429B2

(12) United States Patent
Schwyzer et al.

(10) Patent No.: US 12,619,429 B2
(45) Date of Patent: May 5, 2026

(54) LARGE LANGUAGE MODEL-BASED SOFTWARE REVERSE ENGINEERING ASSISTANT

(71) Applicant: CrowdStrike, Inc., Sunnyvale, CA (US)

(72) Inventors: Felix Schwyzer, Berlin (DE); Aditya Kapoor, Portland, OR (US); Calin-Bogdan Miron, Nottingham (GB); Marian Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 153 days.

(21) Appl. No.: 18/395,939

(22) Filed: Dec. 26, 2023

(65) Prior Publication Data

US 2025/0208861 A1 Jun. 26, 2025

(51) Int. Cl.
*G06F 8/74* (2018.01)
*G06F 21/14* (2013.01)
(Continued)

(52) U.S. Cl.
CPC ............... *G06F 8/74* (2013.01); *G06F 21/56* (2013.01); *G06F 21/562* (2013.01);
(Continued)

(58) Field of Classification Search
CPC . G06F 8/74; G06F 21/14; G06F 21/56; G06F 21/562; G06F 21/563;
(Continued)

(56) References Cited

U.S. PATENT DOCUMENTS

| 2024/0086536 A1* | 3/2024 | Rosen | G06F 21/566 |
| 2024/0184556 A1* | 6/2024 | Singh | G06F 8/73 |

FOREIGN PATENT DOCUMENTS

| EP | 4481560 A1 * | 12/2024 | G06N 3/045 |
| KR | 20230062204 A * | 5/2023 | G06F 21/56 |

OTHER PUBLICATIONS

Hajarnis, Kimaya, et al., A Comprehensive Solution for Obfuscation Detection and Removal Based on Comparative Analysis of Deobfuscation Tools, Intern'l Conf. on Smart Generation Computing, Comm. and Networking, 2021, 7 pages, [retrieved on Jul. 25, 2025], Retrieved from the Internet: <URL:http://ieeexplore.ieee.org/>.*

* cited by examiner

*Primary Examiner* — Geoffrey R St Leger
(74) *Attorney, Agent, or Firm* — Womble Bond Dickinson (US) LLP

(57) ABSTRACT

Systems and methods of utilizing a large language model (LLM) to reverse engineer software is provided. The method includes obtaining sample assembly language from coded information or data. The sample assembly language is input to a machine learning (ML) model trained to recognize when the sample assembly language includes malicious code. The method further includes identifying, from the sample assembly language, a functionality implemented by the sample assembly language, where the functionality is indicative of whether the sample assembly language includes the malicious code. The method further includes generating, by a processing device, a natural language indication of the functionality implemented by the sample assembly language. The natural language indication is an output of the ML model.

20 Claims, 4 Drawing Sheets

(51) Int. Cl.
  *G06F 21/56*          (2013.01)
  *G06N 3/08*           (2023.01)
  *G06N 20/00*          (2019.01)

(52) U.S. Cl.
  CPC .......... *G06F 21/563* (2013.01); *G06F 21/566*
        (2013.01); *G06N 3/08* (2013.01); *G06N 20/00*
            (2019.01); *G06F 21/14* (2013.01)

(58) Field of Classification Search
  CPC ....... G06F 21/566; H04L 63/14; G06N 3/044;
            G06N 3/08; G06N 3/045; G06N 20/00
  See application file for complete search history.

200

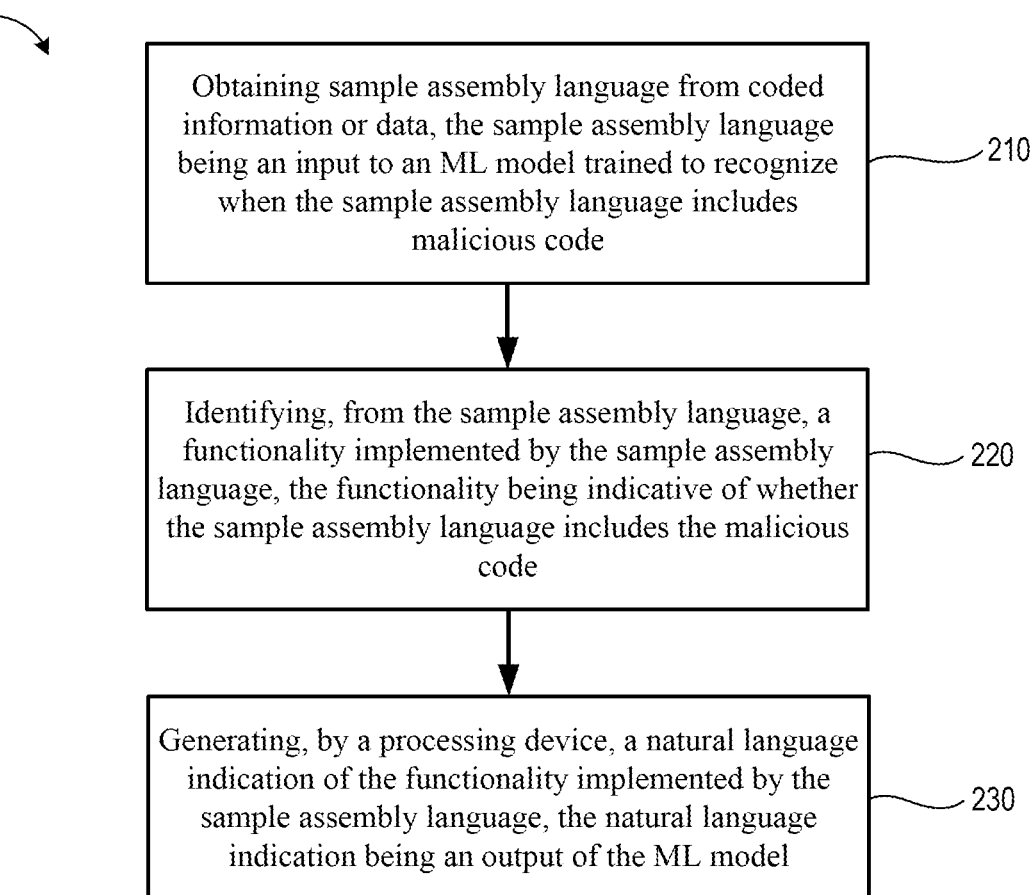

Obtaining sample assembly language from coded information or data, the sample assembly language being an input to an ML model trained to recognize when the sample assembly language includes malicious code — 210

Identifying, from the sample assembly language, a functionality implemented by the sample assembly language, the functionality being indicative of whether the sample assembly language includes the malicious code — 220

Generating, by a processing device, a natural language indication of the functionality implemented by the sample assembly language, the natural language indication being an output of the ML model — 230

FIG. 2

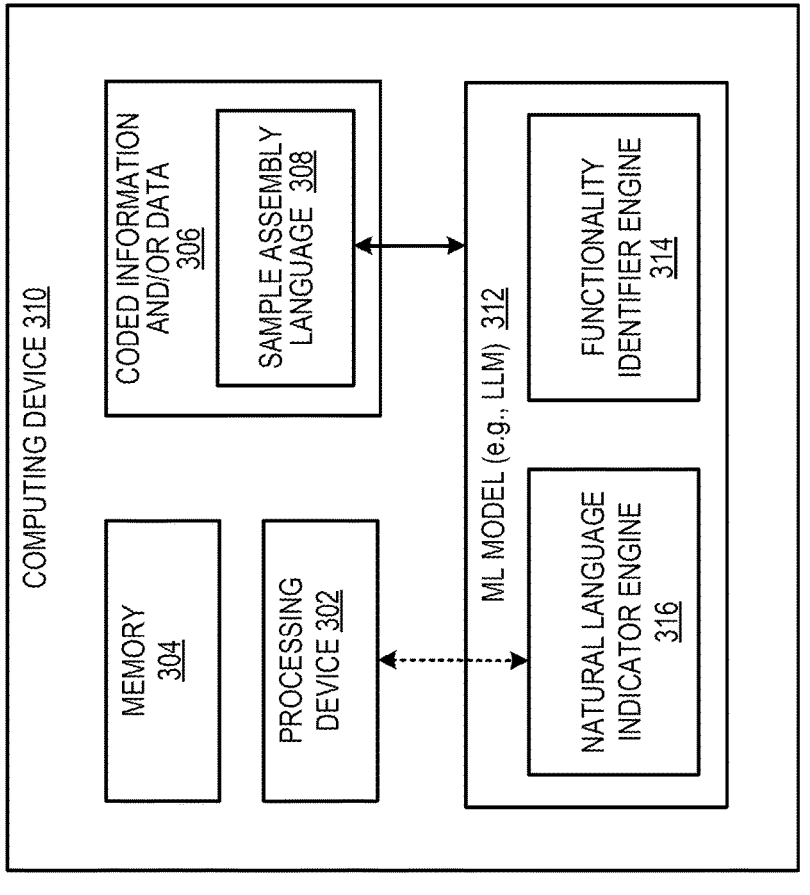
FIG. 3

LARGE LANGUAGE MODEL-BASED SOFTWARE REVERSE ENGINEERING ASSISTANT

TECHNICAL FIELD

Aspects of the present disclosure relate to machine learning (ML) models, and more particularly, to large language models (LLMs) used for reverse engineering.

BACKGROUND

Large language models are designed to understand and generate coherent and contextually relevant text. Large language models are typically built using deep learning techniques using a neural network architecture and are trained on substantial amounts of text data for learning to generate responses. The training process for large language models involves exposing the model to vast quantities of text from various sources, such as books, articles, websites, and other data.

Large language models use tokens as fundamental units into which text is divided for processing. Tokens are usually smaller units of text, such as individual characters, sub words (e.g., byte-pair encoding), or words. Large language models tokenize queries and general text documentation as part of their input processing, which enables large language models to manage large volumes of general text documentation efficiently. By breaking the text into tokens and representing text numerically, large language models can understand and generate responses based on the underlying patterns and relationships within the text.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a flow diagram of a method for generating a natural language indication of functionality implemented by sample assembly language, in accordance with some embodiments of the present disclosure.

FIG. 3 is a component diagram of an example of a device architecture for ML-based software reverse engineering assistance, in accordance with some embodiments of the present disclosure.

DETAILED DESCRIPTION

Figure 1:
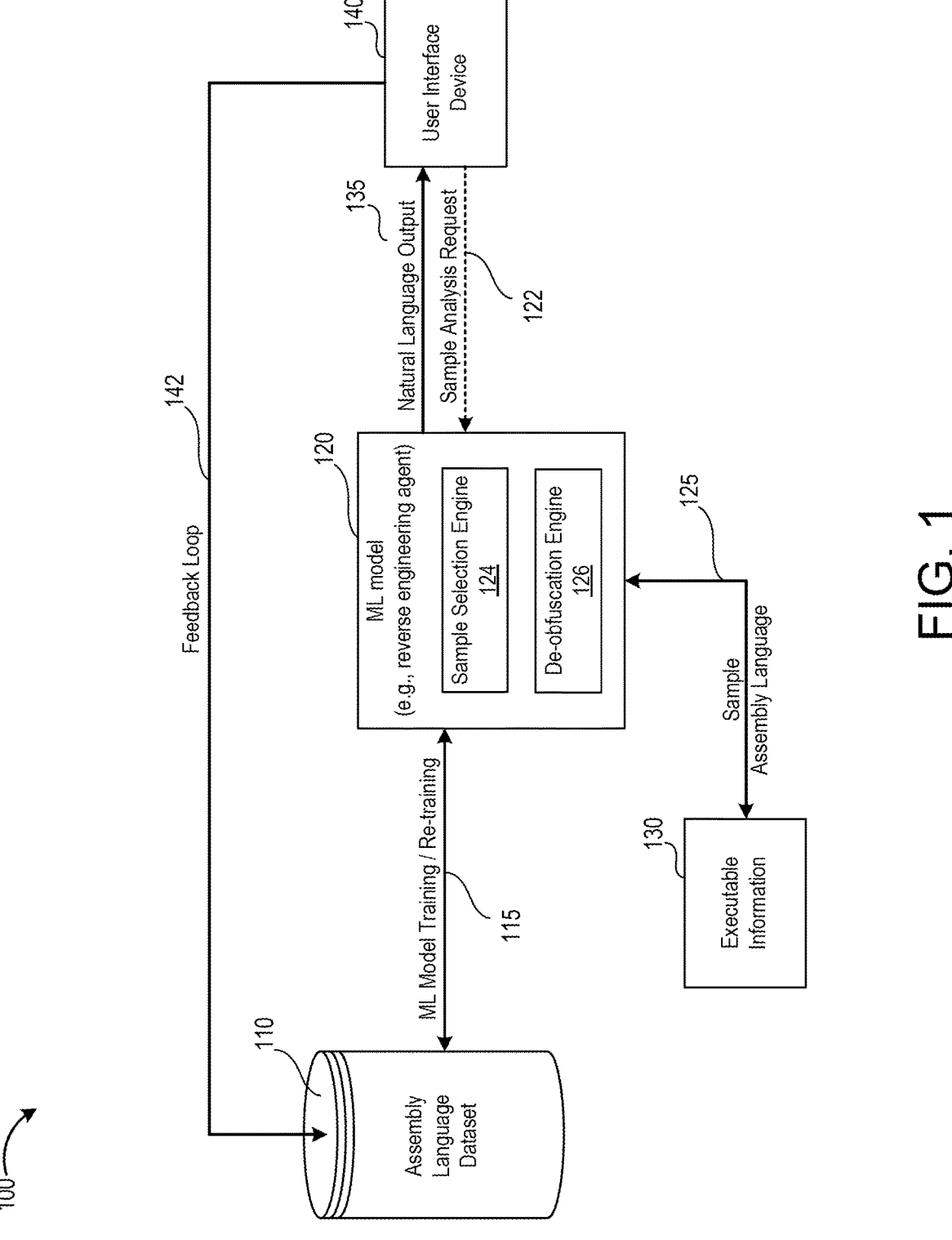
FIG. 1 is a block diagram that illustrates an example system for assembly language sample analysis, in accordance with some embodiments of the present disclosure.

Malware analysis techniques can include a static analysis of source code for determining whether the source code includes, or is accompanied by, malicious code. In this domain, static analysis refers to a reverse engineering procedure that allows for an inspection/examination of the source code without having to execute the source code. For example, when analyzing a portable executable (PE), the static analysis may include interpreting an assembly language representation of associated binary code. In this manner, malware such as file infectors that accompany the source code can be detected without compromising a host device or associated information through execution of an infected executable.

Oftentimes, a significant amount of time is expended attempting to detect malicious functions at the assembly language representation level of the source code. Assembly language is a low-level programing language that simplifies binary instructions that are input to a processing device, such as a central processing unit (CPU). More specifically, assembly language is a human-readable abstraction (e.g., text characters) mapped to machine (e.g., binary) code, so that programmers do not have to manually count 1's and 0's to understand the code.

However, even the assembly language may not be readily understood by some operators. Thus, if a malicious function is detected in the assembly language, such functionality may have to be indicated as a natural language expression in order for the functionality to be understood by the operator. In some cases, converting the assembly language to natural language expressions can be a manual procedure that is both time-consuming and tedious.

Malware may be obfuscated by a malicious actor to make the malware more difficult to detect. When statically analyzing assembly language representations of malware samples, the analyzer may have to de-obfuscate the code or data. De-obfuscation routines identified in the sample may be reimplemented to de-obfuscate the code or data. For example, a higher-level language, such as Python, may be used to reimplement the code or data. Again, however, reimplementing de-obfuscation routines can involve a manual component that is both time-consuming and repetitive.

Examples of the present disclosure address the above-noted and other deficiencies by providing an ML model, such as an LLM, that is trained to recognize when sample assembly language includes malicious code. The ML model automates the process of detecting relevant functions mapped to portions of the assembly language. The ML model further converts the assembly language to a natural language expression that indicates the associated functionality to an operator via a display device. While de-compilers and other non-ML tools may increase the speed at which de-obfuscation routines can be reimplemented, such tools do not lift functions from the assembly language to natural language.

The ML model is trained on a dataset of assembly language samples, including benign samples, malicious samples, obfuscated samples, non-obfuscated samples, etc. The ML model may also be trained on a dataset of assembly language representations of de-obfuscation routines to refine the model. The ML model may be a transformer-based model (e.g., a generative pretrained transformer (GPT) model). The ML model may be configured for continuous learning, so that when fresh data is collected, the model may be retrained from time to time (e.g., periodically) on the updated dataset to adapt the model to evolving obfuscation and malware techniques. Human feedback may also be used to improve the performance of the model.

In some examples, the ML model is used to assist with threat analysis workflows in a static manner. For example, a sample such as a PE is submitted to, and received by, an automated sample analysis system. The ML model disassembles the sample to identify relevant functions in the sample, such as de-obfuscation routines. The ML model outputs an indication or description of the functionality implemented by the sample in a natural language format. In some examples, the ML model output may indicate a probability of how likely it is that the sample, or a portion thereof, is malicious. The natural language output may be used for malware report generation, further examination of the sample, and/or presented on a display device for verification and feedback on the output results to improve the performance of the model.

In some implementations, the sample analysis system may receive an indication of a de-obfuscation routine for which the sample analysis system is to generate a de-obfuscation script. In other implementations, the sample analysis system automatically identifies a de-obfuscation routine in the sample and initiates reimplementation of the routine. That is, the model generates the de-obfuscation script through the higher-level language (e.g., Python) and outputs an indication of the script to a display device. The de-obfuscation script can optionally be executed to de-obfuscate code or data within the respective sample. In further implementations, the output is fed back into the sample analysis system to continue the analysis based on the newly available de-obfuscated code or data.

As discussed herein, the present disclosure provides an approach that improves the operation of a computer system by reducing security threats to the computer system. In some implementations, the above-described ML-based reverse engineering assistant operates in an autonomous manner to submit assembly language samples to the sample analysis system and output, via natural language expression, an indication of the sample assembly language functionality. The sample analysis system also performs ML-generated reimplementation of de-obfuscation routines in an autonomous manner. The sample analysis system increases the productivity of reverse engineers and malware analysts and may be integrated into existing tools or configured as a standalone tool.

FIG. 1 is a block diagram that illustrates an example system 100 for assembly language sample analysis, in accordance with some embodiments of the present disclosure. Although this disclosure refers to LLMs and GPTs, various other ML models may be used in addition to, or instead of, the models described herein.

In the example system 100, the ML model 120 analyzes sample assembly language 125 extracted from executable information 130 to determine whether the executable information 130 is associated with a malicious functionality. In some embodiments, the executable information 130 is a portable executable (PE). A PE may include a file format for executables, object code, and dynamic link libraries (DLL). The PE includes a data structure that encapsulates information used to load and manage wrapped executable code, where each section of the data structure may represent a block of functionality (e.g., text for the code, data, etc.). The PE file format includes features for obfuscating a true functionality of the binary code and can be leveraged for malware analysis procedures. In other embodiments, the sample assembly language 125 is extracted from a different type of executable information 130, such as other coded information or data.

Assembly language is a low-level programming language that is closely related to machine language (e.g., binary code) executed by a processing device, such as a CPU. However, assembly language implements text characters that are more human-readable/understandable than binary digits in order to convey information represented in the binary. Processing devices may directly execute the assembly language representation of the binary code. Each assembly language instruction corresponds to a specific operation, such as an arithmetic calculation, data movement, control flows, etc. While assembly language offers increased control and access to underlying hardware, assembly language can still be more difficult to interpret/understand than higher-level languages (e.g., C, Java, Python, etc.) due to its closer proximity to the hardware and lack of abstractions. The sample assembly language 125 refers to at least a portion of the assembly language included in the executable information 130.

The ML model 120 may be implemented as a reverse engineering agent for the sample assembly language 125 extracted from the executable information 130. That is, the ML model 120 may determine a functionality implemented by the sample assembly language 125 without directly executing the sample assembly language 125. Such techniques, in which the extracted code is not executed, may be referred to as a static analysis. The static analysis may include analyzing the structure, behavior, content, etc., of the sample assembly language 125 to determine an impact of the sample assembly language 125 (e.g., benign or malicious) on the system. The static analysis may include file analysis, code analysis, string analysis, de-compilation, dependency analysis, behavior stimulation, amongst others, which may facilitate identification of countermeasures to be taken against identified malware. Further, by performing the static analysis, as opposed to directly executing the sample assembly language 125, the host reduces its likelihood of being infected by the sample assembly language 125 in the event that the sample assembly language 125 includes malware.

The ML model 120 may obtain the sample assembly language 125 based on various triggering events. In a first example, the ML model 120 autonomously obtains the sample assembly language 125 based on execution of an assembly language analysis protocol. For instance, the ML model 120 includes a sample selection engine 124 that the ML model 120 executes for causing the sample assembly language 125 to be submitted as an input to the ML model 120. In a second example, the ML model 120 receives a sample analysis request 122 from a user interface device 140. The ML model 120 is triggered, in response to receiving the sample analysis request 122, to execute the sample selection engine 124 and cause the sample assembly language 125 to be submitted as the input to the ML model 120.

The ML model 120 is trained to recognize when the sample assembly language 125 includes malicious code (e.g., malware). For example, the ML model 120 may receive ML model training 115 on an assembly language dataset 110. Malware can be deployed based on a variety of techniques, such as executable files, scripts, document exploits, drive-by downloads, email attachments, social engineering, removable storage media, network exploits, mobile device exploits, and the like. Hence, the ML model 120 may have to receive ML model re-training 115 from time-to-time (e.g., periodically) to adapt the ML model 120 to ever-evolving malware deployment and implementation schemes.

The assembly language dataset 110 is stored in a database that may include large quantities of assembly language training data, such as benign data samples, malicious data samples, obfuscated data samples, and/or non-obfuscated data samples. The assembly language training data is collected (e.g., over time) and preprocessed for feature extraction/selection in relation to assembly language. Based on the ML model training/re-training 115 on the assembly language dataset 110, the ML model 120 may learn (e.g., as a reverse engineering agent) to interpret sample assembly language 125 that is input to the ML model 120.

The ML model 120 includes a de-obfuscation engine 126 that the ML model 120 may execute to interpret the sample assembly language 125. De-obfuscation refers to the process of reversing obfuscations applied to the code, such as by a malicious actor, that intentionally make the code more complex/difficult to understand. Thus, identifying a functionality implemented by the sample assembly language 125 may include applying a reverse engineering procedure to the sample assembly language 125 to generate de-obfuscated sample assembly language. For example, the ML model 120 may execute the de-obfuscation engine 126 to generate and apply a de-obfuscation script to the sample assembly language 125 using a higher-level language (e.g., C, Java, Python, etc.) than assembly-level language. Disassembly of the sample assembly language 125 may be performed in an autonomous manner based on execution of the de-obfuscation engine 126.

The ML model 120 may select the reverse engineering procedure to apply to the sample assembly language 125 based on various initiating conditions. In a first implementation, the ML model 120 autonomously selects and applies the reverse engineering procedure from a plurality of reverse engineering procedures based on execution of a protocol for de-obfuscating the sample assembly language 125. For instance, the protocol causes the ML model 120 to executes the de-obfuscation engine 126, which indicates which reverse engineering procedure to implement. In a second implementation, the ML model 120 receives an explicit indication from the user interface device 140 of the reverse engineering procedure, such as in the sample analysis request 122 or a separate request (not shown). The ML model 120 is triggered, in response to receiving the indication, to use the indicated reverse engineering procedure for de-obfuscation.

After de-obfuscating the sample assembly language 125, the ML model 120 initiates an implementation of the de-obfuscated sample assembly language. That is, the ML model 120 analyzes whether the sample assembly language 125 includes malicious code. For example, the ML model 120 may identify, from the de-obfuscated sample assembly language, a functionality of the sample assembly language 125, where the functionality may be a benign functionality or a malicious functionality. The ML model 120 may also identify functionalities such as one or more de-obfuscation routines linked to the sample assembly language 125, where the identified de-obfuscation routine(s) may be applied by the ML model 120 to de-obfuscate the sample assembly language 125. In some embodiments, the de-obfuscation engine 126 operates as a functionality identifier of the input sample assembly language 125.

The ML model 120 generates a natural language output 135 that describes the functionality implemented by the sample assembly language 125. That is, rather than outputting an indication of the functionality in an assembly-level format, or even a higher-level format, such as C, Java, or Python, the ML model 120 outputs the indication of the functionality in a natural language format that is even easier for an analyst to interpret/understand. That natural language output 135 from the ML model 120 may indicate, in a same or separate natural language output than the functionality indication, a probability that the sample assembly language 125 includes malicious code. The probability indication may be for certain portion(s) of the sample assembly language 125/executable information 130 or for an entirety of the sample assembly language 125/executable information 130. In some embodiments, the de-obfuscation engine 126 operates as a natural language generator for producing the natural language output 135.

The natural language output 135 is provided to the user interface device 140, which may be configured to display the natural language output 135 in an interpretable natural language form. In some examples, the natural language output 135 is used for malware report generation. Upon inspection/verification of the results output from the ML model 120, a feedback loop 142 implemented via the user interface device 140 may be used to provide feedback on the accuracy of the natural language output 135. The feedback loop 142 allows the output of the ML model 120 to be added to the assembly language dataset 110, such that ML model re-training 115 may be performed on the ML model 120 based on updates/feedback to the assembly language dataset 110.

FIG. 2 is a flow diagram of a method 200 for generating a natural language indication of functionality implemented by sample assembly language, in accordance with some embodiments of the present disclosure. A description of elements of FIG. 2 that have been previously described will be omitted for brevity. Method 200 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 200 may be performed by processing device 302 shown in FIG. 3.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 have to be performed.

With reference to FIG. 2, method 200 begins at block 210, whereupon processing logic is obtaining sample assembly language from coded information or data, the sample assembly language being an input to an ML model trained to recognize when the sample assembly language includes malicious code. In some embodiments, the sample assembly language is similar to the assembly language sample 125. In some embodiments, the coded information or data is similar to the executable information 130. In some embodiments, the ML model is similar to the ML model 120 (e.g., reverse engineering agent). In some embodiments, the training of the ML model is similar to the ML training/re-training 115 on the assembly language dataset 110.

At block 220, the processing logic is identifying, from the sample assembly language, a functionality implemented by the sample assembly language, the functionality being indicative of whether the sample assembly language includes the malicious code. In some embodiments, the identifying of the functionality is similar to execution of the de-obfuscation engine 126. For example, the de-obfuscation engine 126 may de-obfuscate the assembly language sample 125 extracted from the executable information 130.

At block 230, the processing logic is generating a natural language indication of the functionality implemented by the sample assembly language, the natural language indication being an output of the ML model. In some embodiments, the natural language indication of the functionality is similar to the natural language output 135. For example, the ML model 120 (e.g., reverse engineering agent) indicates the natural language output 135 to the user interface device 140.

FIG. 3 is a component diagram of an example of a device architecture 300 for ML-based software reverse engineering assistance, in accordance with embodiments of the disclosure. The device architecture 300 includes a computing device 310 having a processing device 302 and memory 304, which may implement the aspects described herein with respect to FIGS. 1 to 2.

Referring to FIG. 3, the computing device 310 (e.g., including the ML model 312) may obtain sample assembly language 308 from coded information and/or data 306. In some embodiments, the sample assembly language 308 may be similar to the sample assembly language 125 described herein with respect to FIG. 1. In some embodiments, the coded information and/or data 306 may be similar to the executable information 130 described herein with respect to FIG. 1.

The sample assembly language 308 is an input to an ML model (e.g., LLM) 312 trained to recognize when the sample assembly language 308 includes malicious code. In some embodiments, the ML model 312 may similar to the ML model 120 described herein with respect to FIG. 1. In some embodiments, the ML model 312 is trained in a similar manner to the ML model training/re-training 115 described herein with respect to FIG. 1.

The computing device 310 (e.g., including the ML model 312) may identify, from the sample assembly language 308 based on a functionality identifier engine 314, a functionality implemented by the sample assembly language 308. In some embodiments, the functionality identifier engine 314 may be similar to the de-obfuscation engine 126 described herein with respect to FIG. 1. In some embodiments, the functionality identifier engine 314 is included in the ML model 312 similar to the de-obfuscation engine 126 being included in the ML model 120 of FIG. 1. The functionality detected by the functionality identifier engine 314 is indicative of whether the sample assembly language 308 includes the malicious code.

The computing device 310 (e.g., including the ML model 312) generates, by a processing device 302 that executes a natural language indication engine 316, a natural language indication of the functionality implemented by the sample assembly language 308. In some embodiments, the natural language indication engine 316 may be similar to the de-obfuscation engine 126 described herein with respect to FIG. 1. In some embodiments, the natural language indication engine 316 is included in the ML model 312 similar to the de-obfuscation engine 126 being included in the ML model 120 of FIG. 1.

The natural language indication is an output of the ML model 316. In some embodiments, the natural language indication from the ML model 316 is similar to the natural language output 135 from the ML model 120 described herein with respect to FIG. 1.

Figure 4:
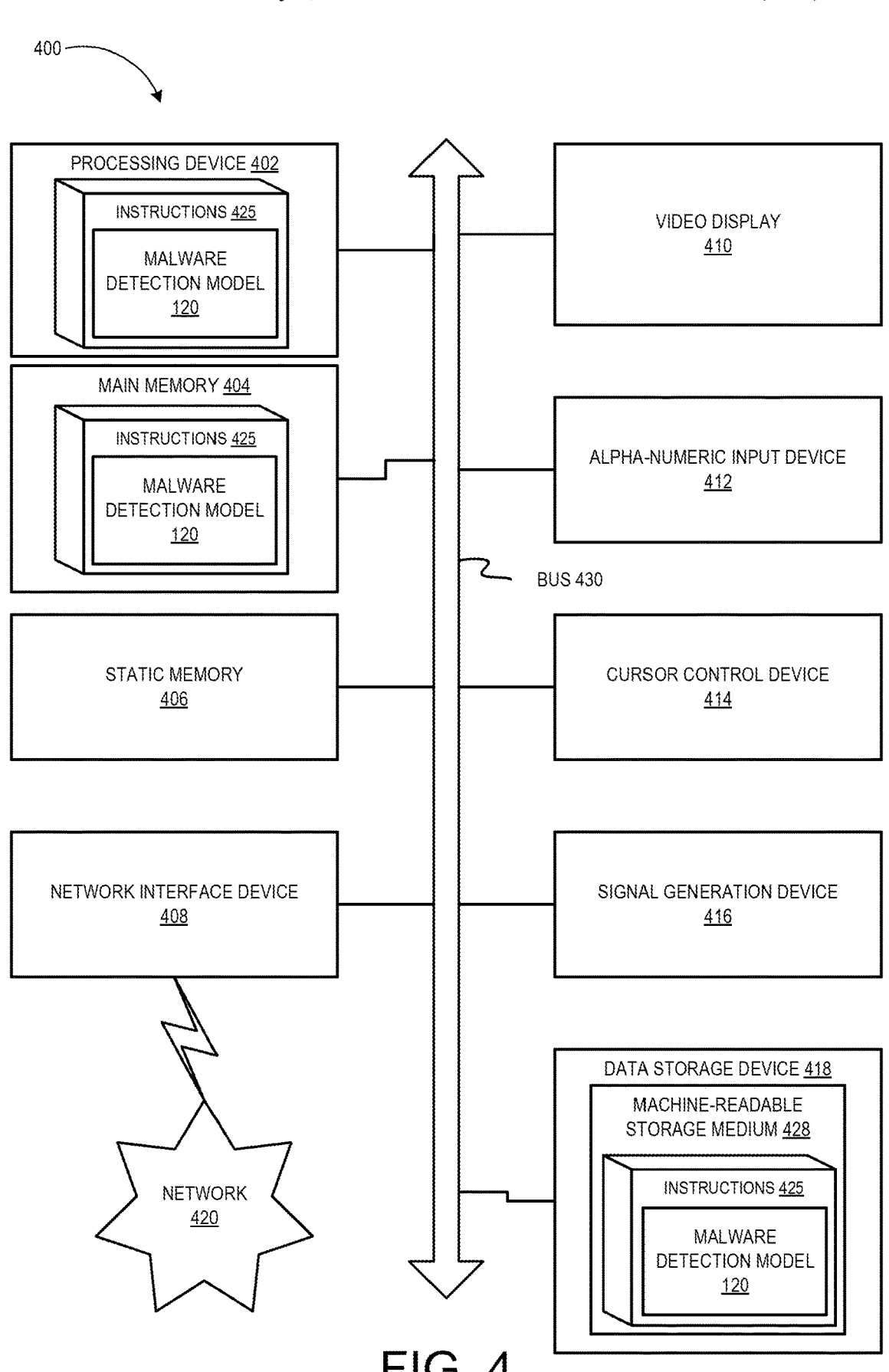
FIG. 4 is a block diagram of an example computing device that may perform one or more of the operations described herein, in accordance with some embodiments of the disclosure.

FIG. 4 is a block diagram of an example computing device 400 that may perform one or more of the operations described herein, in accordance with some embodiments of the disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory) and a data storage device 418, which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may execute the operations described herein, in accordance with one or more aspects of the present disclosure, for performing the operations and steps discussed herein.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for LLM operations, such as malware detection model 120, for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining," "identifying," "generating," "de-obfuscating," "executing," "retraining," "applying," "receiving," "initiating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
   executing a first protocol for autonomous selection and submission of sample assembly language as an input to a machine learning (ML) model;
   obtaining, based on the first protocol, the sample assembly language from coded information or data, the ML model being trained to recognize when the sample assembly language includes malicious code;
   identifying, from the sample assembly language, a functionality implemented by the sample assembly language, the functionality being indicative of whether the sample assembly language includes the malicious code; and
   generating, by a processing device, a natural language indication of the functionality implemented by the sample assembly language, the natural language indication being an output of the ML model.

2. The method of claim 1, wherein the identifying the functionality implemented by the sample assembly language comprises:

de-obfuscating the sample assembly language based on a de-obfuscation script generated with a higher-level language than the sample assembly language.

3. The method of claim 1, further comprising:

retraining the ML model on an assembly language dataset based on updates to the assembly language dataset, the assembly language dataset including benign samples, malicious samples, obfuscated samples, and non-obfuscated samples.

4. The method of claim 1, wherein the identifying the functionality implemented by the sample assembly language, comprises:

applying a reverse engineering procedure to the sample assembly language to generate de-obfuscated sample assembly language.

5. The method of claim 4, wherein the applying the reverse engineering procedure, comprises at least one of:

executing a second protocol for autonomous selection of the reverse engineering procedure from a plurality of reverse engineering procedures, or receiving an explicit indication of the reverse engineering procedure.

6. The method of claim 4, further comprising:

initiating an implementation of the de-obfuscated sample assembly language, the implementation comprising analyzing whether the sample assembly language includes the malicious code.

7. The method of claim 1, wherein the natural language indication output by the ML model further indicates a probability of the sample assembly language including the malicious code.

8. The method of claim 1, wherein the sample assembly language corresponds to a portable executable (PE) file.

9. A system comprising:

a processing device; and a memory to store instructions that, when executed by the processing device cause the processing device to:

execute a first protocol for autonomous selection and submission of sample assembly language as an input to a machine learning (ML) model;

obtain, based on the first protocol, the sample assembly language from coded information or data, the ML model being trained to recognize when the sample assembly language includes malicious code;

identify, from the sample assembly language, a functionality implemented by the sample assembly language, the functionality being indicative of whether the sample assembly language includes the malicious code; and generate a natural language indication of the functionality implemented by the sample assembly language, the natural language indication being an output of the ML model.

10. The system of claim 9, wherein to identify the functionality implemented by the sample assembly language the processing device is further to:

de-obfuscate the sample assembly language based on a de-obfuscation script generated with a higher-level language than the sample assembly language.

11. The system of claim 9, wherein the processing device is further to:

retrain the ML model on an assembly language dataset based on updates to the assembly language dataset, the assembly language dataset including benign samples, malicious samples, obfuscated samples, and non-obfuscated samples.

12. The system of claim 9, wherein to identify the functionality implemented by the sample assembly language the processing device is further to:

apply a reverse engineering procedure to the sample assembly language to generate de-obfuscated sample assembly language.

13. The system of claim 12, wherein to apply the reverse engineering procedure the processing device is to at least one of:

execute a second protocol for autonomous selection of the reverse engineering procedure from a plurality of reverse engineering procedures, or receive an explicit indication of the reverse engineering procedure.

14. The system of claim 12, wherein the processing device is further to:

initiate an implementation of the de-obfuscated sample assembly language, the implementation comprising analyzing whether the sample assembly language includes the malicious code.

15. The system of claim 9, wherein the natural language indication output by the ML model further indicates a probability of the sample assembly language including the malicious code.

16. The system of claim 9, wherein the sample assembly language corresponds to a portable executable (PE) file.

17. A non-transitory computer-readable storage medium including instructions that, when executed by a processing device, cause the processing device to:

execute a first protocol for autonomous selection and submission of sample assembly language as an input to a machine learning (ML) model;

obtain, based on the first protocol, the sample assembly language from coded information or data, the ML model being trained to recognize when the sample assembly language includes malicious code;

identify, from the sample assembly language, a functionality implemented by the sample assembly language, the functionality being indicative of whether the sample assembly language includes the malicious code; and generate, by the processing device, a natural language indication of the functionality implemented by the sample assembly language, the natural language indication being an output of the ML model.

18. The non-transitory computer-readable storage medium of claim 17, wherein to identify the functionality implemented by the sample assembly language the processing device is further to:

de-obfuscate the sample assembly language based on a de-obfuscation script generated with a higher-level language than the sample assembly language.

19. The non-transitory computer-readable storage medium of claim 17, wherein the processing device is further to:

retrain the ML model on an assembly language dataset based on updates to the assembly language dataset, the assembly language dataset including benign samples, malicious samples, obfuscated samples, and non-obfuscated samples.

20. The non-transitory computer-readable storage medium of claim 19, wherein the processing device is further to:

execute a second protocol for autonomous selection of a reverse engineering procedure from a plurality of reverse engineering procedures, or receive an explicit indication of the reverse engineering procedure.

\* \* \* \* \*